US008615858B2

(12) United States Patent
Holtzman

(10) Patent No.: US 8,615,858 B2

(45) Date of Patent: Dec. 31, 2013

(54) CYLINDER AND PISTON GOLF SHAFT EXTRACTOR

(76) Inventor: Barry Lyn Holtzman, Eagle River, WI (US)

( * ) Notice: Subject to any disclaimer, the term of this patent is extended or adjusted under 35 U.S.C. 154(b) by 359 days.

(21) Appl. No.: 13/066,820

(22) Filed: Apr. 25, 2011

(65) Prior Publication Data

US 2012/0266427 A1 Oct. 25, 2012

(51) Int. Cl.
*B23P 19/04* (2006.01)

(52) U.S. Cl.
USPC ............................................ 29/239; 29/244

(58) Field of Classification Search
USPC ........... 29/239, 238, 252, 235, 270, 278, 280, 29/255, 263, 244, 279
See application file for complete search history.

(56) References Cited

U.S. PATENT DOCUMENTS 6,449,823 B2 * 9/2002 Krapp ............................ 29/244
6,854,170 B1 2/2005 D'Aguanno
7,043,809 B1 5/2006 Latiri

* cited by examiner

*Primary Examiner* — Lee D Wilson
*Assistant Examiner* — Nirvana Deonauth

(57) ABSTRACT

In one embodiment, an extraction apparatus used to pull a golf shaft out of a club head comprises a hosel engagement member, an annular cylinder bore and piston assembly, and a shaft clamping device. The assembly is positioned on the shaft by passing the shaft through an axial hole in the assembly and the hosel engagement member is placed next to the head's hosel. The shaft is clamped in the clamping device so that the hosel, the hosel engagement member, and the cylinder and piston assembly are held tightly against the clamping device. The cylinder is then pressurized, thereby applying a force to the piston and an extraction force to the head which is essentially symmetrical with the shaft. The hosel is then heated to weaken its adhesive bond to the shaft so the piston is able to move and push the head away from the shaft.

18 Claims, 2 Drawing Sheets

CYLINDER AND PISTON GOLF SHAFT EXTRACTOR

CROSS REFERENCE TO RELATED APPLICATIONS

Not applicable

FEDERALLY SPONSORED RESEARCH OR DEVELOPMENT

Not applicable SEQUENCE LISTING, TABLE, OR PROGRAM

Not applicable

BACKGROUND

1. Field

This application relates to extractors used to pull a golf club shaft out of a golf club head.

2. Prior Art

Golf clubs have three main components; a shaft with a club head attached to its tip end and a grip covering its butt end. Heads are attached to shafts typically by adhesively securing the shaft into hole in a tubular extension of the head called a hosel. Sometimes it is necessary to extract a golf shaft from its head because the shaft has been damaged or because a golfer would like to try a different shaft in a head.

A desirable feature of a golf club shaft extractor is that its extraction force is applied symmetrically around the axis of the shaft. An asymmetrical force will apply a bending moment which can bend the shaft and cause damage: A bending moment in the shaft will also cause it to be held more tightly in its hosel hole than would otherwise be the case, because the moment urges the shaft to be moved out of alignment with the hole, causing a "binding" effect. Therefore, for any given set of conditions, an extractor which applies an extraction force which is more symmetrical with the shaft will result in less shaft bending and less extraction force than an extractor which applies a force which is more asymmetrical.

Another desirable feature is that the extractor can be used on a shaft which has a grip installed. A grip is normally cut and therefore ruined when removed. If a golfer extracts a shaft but later wants to use the shaft again, if the grip was removed to do the extraction, a new grip must be installed on the shaft, requiring extra time and expense.

An obviously desirable feature is that the extractor has a low manufacturing cost, and few parts, low weight, and relatively simple design help achieve this.

Two golf shaft extractors which use a piston and cylinder in their operation are described in U.S. Pat. No. 6,854,170 to D'Aguanno and U.S. Pat. No. 7,043,809 to Latiri. Both of these extractors use a bottle jack to apply a force to a golf club head while the shaft is held in a clamping device. The axis of the bottle jack is positioned away from the axis of the shaft, and therefore the jack's force vector is essentially parallel to, but not co-linear with, the axis of the shaft. This asymmetrical, off-center force results in a bending moment with respect to the shaft which is the product of the magnitude of the force times the displacement of the force vector from the shaft's axis. Both extractors use a fairly rigid frame to reduce the bending moment that is actually applied to the shaft by this asymmetrical force, but this frame adds cost and weight. The bending moment actually applied to the shaft, even though reduced, will still bend the shaft and add to the required extraction force.

Also, both of these inventions discuss the advantage of using a spring, compressed by the bottle jack, to allow smooth, hands-free extractor operation. This spring is beneficial because bottle jacks use a relatively incompressible fluid for the pressurized medium and therefore have a very high effective "spring rate" in their operation. In other words, absent a force applied to the handle of the bottle jack, even a slight outward movement of the jack's piston results in a significant decrease in hydraulic pressure and force applied by the jack. These extractors, without the use of a "softening" spring, would have an undesirably short effective extraction stroke, and would therefore require the operator to constantly apply a force to the jack's handle during operation to maintain the jack's extraction force.

SUMMARY

In accordance with one embodiment, a golf shaft extraction apparatus includes an annular cylinder bore and piston assembly which is placed on a golf club shaft between the club's head and a shaft clamping device. Bore pressurization applies to the head an extraction force which is symmetrical with the shaft, and after the head is heated, the force moves the head away from, the shaft.

DRAWINGS-BRIEF DESCRIPTION

REFERENCE NUMERALS

DRAWINGS - REFERENCE NUMERALS

| | |
|---|---|
| 1 | golf club head |
| 4 | golf club shaft |
| 5 | golf club grip |
| 6 | club head hosel |
| 7 | vise |
| 8 | clamping cushion |
| 12 | hosel engagement member |
| 16 | tapered cavity |
| 18 | slot |
| 19 | shoulder |
| 20 | cylinder bore and piston assembly |
| 21 | cylinder body |
| 22 | cylinder body passage |
| 25 | cylinder bore |
| 26 | bore outer wall |
| 27 | bore inner wall |
| 28 | retaining ring groove |
| 29 | retaining ring |
| 31 | piston |
| 36 | outer o-ring |
| 37 | inner o-ring |
| 41 | male pressure fitting |
| 43 | pressurization passage |
| 45 | pressurized line with female fitting |

DETAILED DESCRIPTION OF AN EMBODIMENT OF THE INVENTION

FIG. 1

Figure 1:
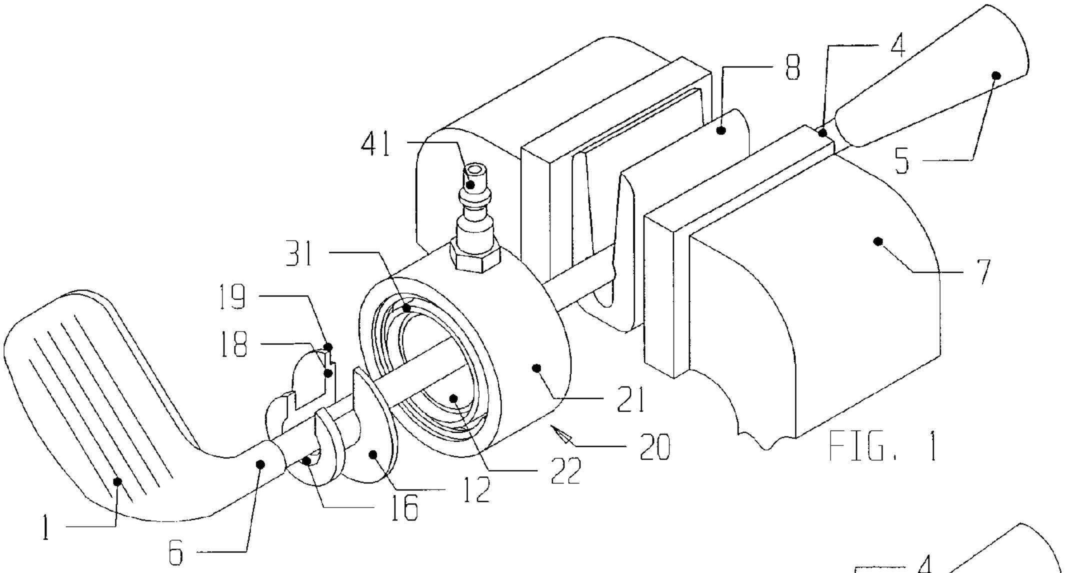
FIGS. 1, 2 and 3 are perspective views showing a golf club and sequential operating positions of an embodiment of a club shaft extraction apparatus of this invention; the apparatus comprises a shaft clamping device, a cylinder bore and piston assembly, and a hosel engagement member.

FIG. 1 shows a golf club and an embodiment of a golf shaft extraction apparatus of this invention. The golf club has a head 1 attached to the tip end of a shaft 4 and a grip 5 applied to its butt end. Head 1 has a tubular-shaped extension, a hosel 6, which contains a hole into which shaft 4 is secured using a suitable adhesive, usually an epoxy.

One component of this extraction apparatus is a shaft clamping device, shown as a vise 7 and a clamping cushion 8; cushion 8 prevents shaft 4 damage when vise 7 is closed to hold shaft 4. Most club fitters already have vise 7 and clamping cushion 8 as these items are normally used in other maintenance procedures for golf clubs. Note that vise 7 is not closed sufficiently in this figure to effectively clamp shaft 4.

Also shown is a hosel engagement member 12. Some beneficial design features of hosel engagement member 12 are discussed in Applicant's co-pending application Ser. No. 12/928,009. Member 12 has a tapered cavity 16 into which hosel 6 is placed and a slot 18 which allows member 12 to be placed over shaft 4. Slot 18 has sufficient depth to allow the axis of member 12 to be essentially co-linear with the axis of shaft 4. A shoulder 19 is provided on member 12 to center on and transfer a force from another component of this extraction apparatus, cylinder bore and piston assembly 20.

Cylinder bore and piston assembly 20 includes a cylinder body 21 which has an axial cylinder body passage 22; assembly 20 is placed on the golf club by inserting shaft 4 through passage 22. Passage 22 is shown having sufficient diameter to even have allowed grip 5 to pass through. A piston 31 is shown inserted relatively deeply into cylinder body 21, but piston 31 can be urged to move outwardly from body 21 by application of pressure to a male pressure fitting 41.

Figure 2:
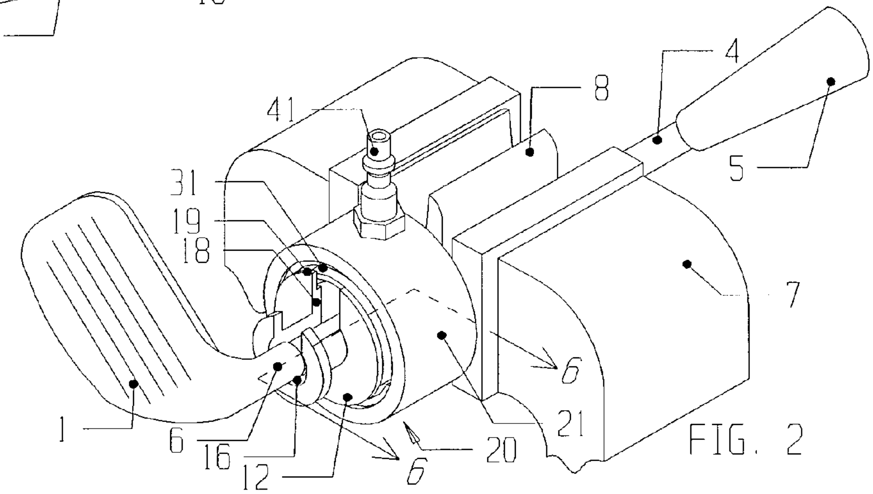
Figure 3:
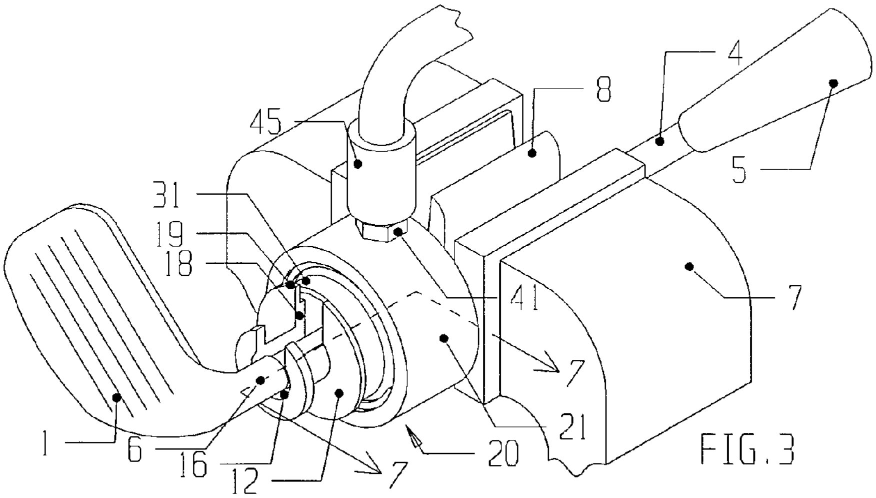

Operation—FIGS. 2 and 3

FIGS. 2 and 3 show two additional operating positions of the extraction apparatus of FIG. 1. In FIG. 1, hosel 6, hosel engagement member 12, cylinder bore and piston assembly 20, and vise 7 are all spaced apart, and vise 7 is shown in a relatively open position so shaft 4 is not effectively held. In FIG. 2, these items are not spaced apart but are positioned tightly together. To get from the spaced positioning shown in FIG. 1 to the tight positioning shown in FIG. 2, club head 1 is moved toward vise 7 until hosel engagement member 12 and assembly 20 are tightly placed between hosel 6 and vise 7. Vise 7 is then moved to a more closed position so it effectively clamps shaft 4 and prevents movement of shaft 4 in vise 7.

FIG. 3 shows the club and the extraction apparatus positions after extraction has progressed. The first operational step required to get from FIG. 2 to FIG. 3 is connection of a pressurized line with female fitting 45 to male pressure fitting 41; this connection is commonly called a quick-connect or quick-disconnect. This applies pressure to cylinder bore and piston assembly 20, thus exerting a force on piston 31 which urges it to move outwardly from cylinder body 21. The force on piston 31 is transmitted through hosel engagement member 12 to hosel 6 of head 1, and since shaft 4 is securely held in vise 7, this force urges hosel 6 to move away from shaft 4. Hosel 6 normally does not move relative to shaft 4 at this time because of the adhesive bond between them. To weaken the adhesive bond, hosel 6 is now heated. The adhesive is typically an epoxy, and the heating is typically performed using an electric heat gun or gas torch, not shown. At some point, heating will sufficiently weaken the adhesive bond so that piston 31 can move outwardly from cylinder body 21, thereby moving hosel 6 of head 1 away from shaft 4.

Figure 4:
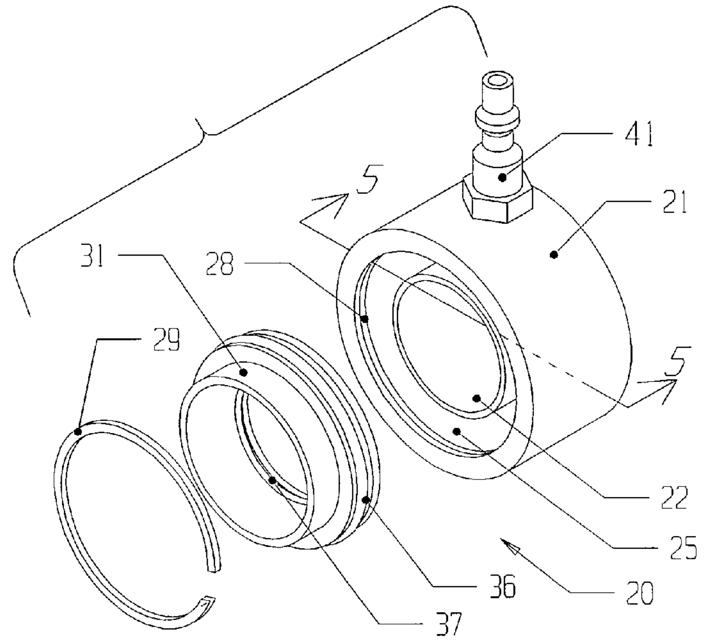
FIG. 4 shows in perspective an exploded view of the cylinder bore and piston assembly.
Figure 5:
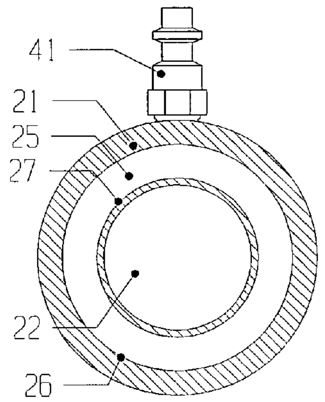
FIG. 5 shows a cross-sectional view of the cylinder bore.

FIGS. 4 and 5

FIG. 4 is an exploded view showing in more detail cylinder bore and piston assembly 20. Cylinder body 21, as discussed above, contains an axially located passage 22 which allows assembly 20 to be placed on shaft 4. Lying outside and around passage 22 is a cylinder bore 25 which accepts piston 31. Cylinder body 21 also contains a retaining ring groove 28 into which a retaining ring 29 is secured after piston 31 is inserted into bore 25; ring 29 limits outward movement of piston 31 in bore 25. Also shown on piston 31 are an external o-ring 36 and an internal o-ring 37 which seal piston 31 to bore 25.

FIG. 5 shows a cross-sectional view, taken as shown in FIG. 4, of cylinder body 21. This figure shows an outer wall 26 and an inner wall 27 of bore 25. This view shows that this construction plane, a plane which is perpendicular to the axis of cylinder body 21 and to the direction of piston 31 movement, has an intersection with bore 25 which is an annulus. Outer wall 26 defines the outer circle of the annulus and inner wall 27 defines the inner circle of the annulus. This figure also shows more clearly passage 22 axially located in cylinder body 21.

If the cross section of bore 25 is symmetrical with shaft 4, then the force exerted by piston 31 when bore 25 is pressurized will be symmetrical with shaft 4, and the force will not apply a bending moment to shaft 4. Because of the annular construction of cylinder bore and piston assembly 20 with its cylinder bore 25 having an annular profile, bore 25 can by positioned so that its cross section is symmetrical with shaft 4 simply by locating the center of its annulus on the axis of shaft 4. If this is done, the force on piston 31 will be symmetrical with the axis of shaft 4.

It is to be noted that the annular shape of cylinder bore 25 shown in FIG. 5 is only one of many particular cylinder bore profiles which will apply little or no bending moment to shaft 4. A term "bore cross section" can be defined as an intersection of any particular bore with a plane perpendicular to a its particular piston's travel. In the case of the annular bore 25 shown in FIG. 5, the bore cross section is the annulus defined by concentric circles corresponding to walls 26 and 27. The centroid of this annulus is of course located at the center of these concentric circles, and if this centroid lies near or on the axis of shaft 4, little or no bending moment will be applied to shaft 4 from pressurization of bore 25. If the centroid of the annulus is to lie near or on the axis of shaft 4, then shaft 4 must pass through the inner circle of the annulus.

Other particular cylinder bore profiles can produce this symmetrically applied force, such as bores having walls which are nesting squares or rectangles, or profiles which are multiple round holes spaced around an axis. The important point in terms of this invention is that for any particular bore profile, if the centroid of its particular bore cross section lies near or on the axis of shaft 4, this particular bore will apply little or no bending moment to shaft 4. In fact, in analyzing the applied extraction force of any particular bore, its particular bore cross section can be replaced with an "equivalent annulus", an annulus which is co-planer with the particular bore cross section, has the same area as the area of the particular bore cross section, and has its center at the same point as the centroid of the particular bore cross section. As above, if the center of the equivalent annulus of any particular bore profile lies near or on the axis of shaft 4, meaning that the centroid of the particular bore cross section lies near or on the axis of shaft 4, little or no bending moment will be applied to shaft 4 by the particular bore profile. Again, for the centroid, or center, of the equivalent annulus to lie near or on the axis of shaft 4, then shaft 4 must pass through the inner circle of the equivalent annulus. Of course the shape of piston 31 will need to be modified to work in these other particular bore profiles, and shoulder 19 of hosel engagement member 12 may need to be changed to accept the new piston shape.

Figure 6:
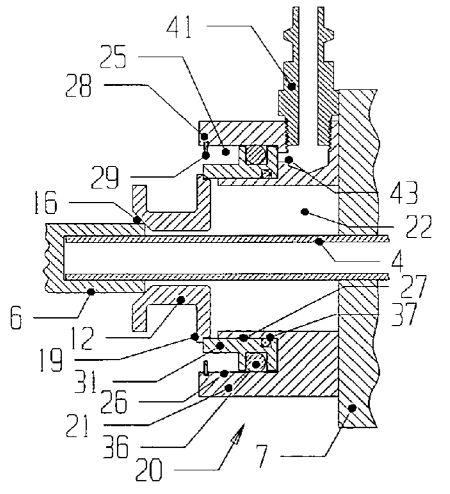
FIG. 6 shows in cross-section some of the items positioned as shown in FIG. 2.
Figure 7:
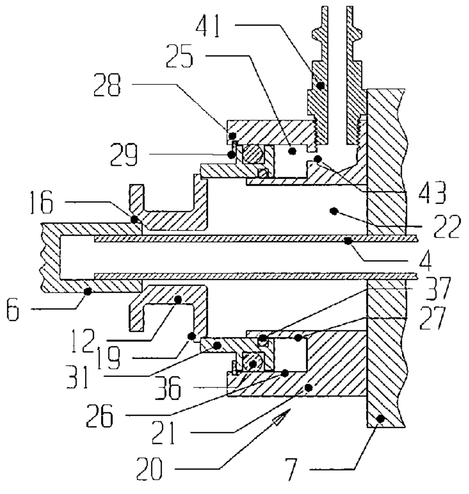
FIG. 7 shows them as they are positioned in FIG. 3.

Operation—FIGS. 6 and 7

FIGS. 6 and 7 are cross-sectional views, taken as shown FIGS. 2 and 3, that may more clearly illustrate some details of cylinder and piston assembly 20 and the component positions shown in FIGS. 2 and 3. Assembly 20 includes cylinder body 21 with cylinder bore 25 limited by outer wall 26 and inner wall 27. A portion of bore 25, a portion which is limited by a displacement along the direction of travel of piston 31, is a volume which is an annular section. These figures show more clearly how piston 31 is sealed to outer wall 26 of bore 25 by o-ring 36 and to inner wall 27 of bore 25 by o-ring 37. FIG. 6 shows an initial position of piston 31 deep into bore 25 before extraction occurs, as in FIG. 2. FIG. 7 shows a later position in which piston 31 has moved outwardly in bore 25 until further movement is prevented by retaining ring 29, as in FIG. 3. These figures also show male pressure fitting 41 installed in cylinder body 21 and a pressurization passage 43 provided in body 21 to allow pressurization of cylinder bore 25 when fitting 41 is pressurized.

These figures clearly show the relative positions of hosel 6, shaft 4, hosel engagement member 12, cylinder bore and piston assembly 20, and vise 7. A portion of shaft 4 lies within passage 22 in cylinder body 21, and hosel 6, hosel engagement member 12, and assembly 20 are positioned tightly against vise 7. Tapered cavity 16 and shoulder 19 of member 12 urge hosel 6 and shaft 4 to center on and align with assembly 20 and cylinder bore 25; the axis of the annular section of cylinder bore 25 is urged to be co-linear with the axis of shaft 4. The centroid of the bore cross section of bore 25 will therefore tend to lie on the axis of shaft 4, the force on piston 31 resulting from pressurization of bore 25 will be approximately symmetrical with respect to the axis of shaft 4, and little or no bending moment will be applied to shaft 4 by the force. Also, these figures readily show that if movement of shaft 4 relative to vise 7 is prevented, and if piston 31 moves outwardly in cylinder bore 25, then hosel 6 must move away from shaft 4.

Hydraulic pressure can be used to pressurize fitting 41 to apply the force to piston 31, but air (pneumatic) pressure is more commonly available. Typically, shop air pressures are regulated to around 6.9E06 dynes/cm^2 (100 pounds per square inch (PSI)). A cylinder bore and piston assembly 20 has been manufactured with a cylinder bore 25 having a bore cross section which is an annulus with an outer wall 26 diameter of 4.6 cm (1.81 inches) and an inner wall 27 diameter of 3.2 cm (1.27 inches). The area of this bore cross section has an area of 8.4 cm^2 (1.30 inches^2). If air pressure of 6.9E06 dynes/cm^2 (100 PSI) is applied to piston 31, this will result in a force on piston 31 of about 58E06 dynes (130 pounds). The actual force exerted on hosel engagement member 12 by piston 31 will be reduced primarily by frictional forces which exist between o-rings 36 and 37 and bore walls 26 and 27, this reduction typically being approximately 2E06 dynes (5 pounds). The actual extraction force exerted by assembly 20 on hosel 6 is therefore about 56E06 (125 pounds) at 6.9E06 dynes/cm^2 (100 PSI) applied pressure, and this force has been found to work-well. Of course, the extraction force can be adjusted by adjusting the applied pressure, whether up or down. Also note that since pressure is continually applied to cylinder and piston assembly 20 by pressurized line 45, a constant force is exerted by piston 31 throughout extraction without the need for a spring or operator action.

CONCLUSION, RAMIFICATIONS, AND SCOPE

Accordingly, the reader will see that an embodiment of this golf club shaft extraction apparatus uses a cylinder bore and piston assembly which has an annular cylinder bore profile which can be symmetrically located on the shaft, and upon bore pressurization, the assembly applies an extraction force to the head which is therefore symmetrical with the shaft. Minimal bending moment is applied to the shaft, and therefore shaft bending and extraction force are minimized. Also, there is no need for a heavy, expensive frame to reduce a bending moment which would be applied to the shaft by an asymmetrically applied force, making possible this extraction apparatus which has a relatively small size, light weight, and low cost to produce.

Although the description above contains many specificities, these should not be construed as limiting the scope of the invention but as merely providing illustrations of some embodiments of this invention. For instance, alternate cylinder bore profiles, such as "nesting" squares or rectangles, or holes located around a "bolt circle", in which the centroid of the alternate profile's bore cross section can lie near or on the axis of the golf shaft, can provide a symmetrical extraction force like the embodiment of the invention discussed here. Thus, the scope of the invention should be determined by the appended claims and their legal equivalents, rather than by the examples given.

I claim:

1. An extraction apparatus used to remove a golf club head from a golf club shaft, the apparatus comprising: a cylinder and piston assembly comprising a piston means and a cylinder body, the cylinder body having a cylinder bore in which the piston means moves, the cylinder bore having an intersection with a plane perpendicular to the direction of movement of the piston means which defines a bore cross section and this bore cross section is approximately an annulus having a center, an inner circle, and an outer circle; a sealing means which provides a pressure seal between the piston means and the cylinder bore; a cylinder bore pressurization means; and a shaft clamping means; wherein the cylinder and piston assembly is placed on the golf club shaft by passing the shaft through the inner circle of the annulus, the shaft is held by the shaft clamping means, and the cylinder bore is pressurized pneumatically or hydraulically, thereby applying a force to the piston means; whereby the apparatus urges the head to move away from the shaft.

2. The extraction apparatus of claim 1 wherein a grip is located on the golf club shaft and the grip has passed through the inner circle of the annulus.

3. The extraction apparatus of claim 1 wherein a portion of the cylinder bore is approximately an annular section having an axis, an outer cylindrically shaped surface, and an inner cylindrically shaped surface.

4. The extraction apparatus of claim 3 wherein the axis of the annular section is approximately parallel with the direction of movement of the piston means.

5. The extraction apparatus of claim 3 wherein the golf club shaft has an axis of symmetry and the axis of the golf club shaft can be placed so that it is approximately co-linear with the axis of the annular section.

6. The extraction apparatus of claim 5 wherein the force on the piston means resulting from pressurization of the cylinder bore is approximately symmetrical around the golf club shaft when the axis of symmetry of the golf club shaft is approximately co-linear with the axis of the annular section.

7. The extraction apparatus of claim 3 wherein the sealing means has a first pressure seal between the piston means and the outer cylindrically shaped surface and a second pressure seal between the piston means and the inner cylindrically shaped surface.

8. The extraction apparatus of claim 7 wherein the first pressure seal includes an o-ring and the second pressure seal includes an o-ring.

9. The extraction apparatus of claim 1 wherein the head has a hosel, an engagement member is placed between the hosel and the cylinder and piston assembly, and the extraction apparatus applies a force to the hosel by applying a force to the engagement member.

10. The extraction apparatus of claim 1 wherein the shaft clamping means includes a vise and a shaft clamping cushion.

11. The extraction apparatus of claim 1 wherein the cylinder body has a passage which lies within the inner circle of the annulus and a portion of the golf club shaft is passed through this passage.

12. A cylinder and piston assembly used to push a golf clubhead away from a golf club shaft, the assembly comprising: a piston means; a cylinder body having a passage through which the golf club shaft can pass and a cylinder bore in which the piston means moves, the cylinder bore having an intersection with a plane perpendicular to the direction of movement of the piston means which defines a bore cross section, which is limited by a first perimeter and by a second perimeter which lies within the first perimeter; and a sealing means which provides a pressure seal between the piston means and the cylinder bore; wherein the assembly is placed on the golf club shaft by passing the golf club shaft through the passage and the golf club shaft is clamped so that movement of the piston means can move the golf club head away from the golf club shaft; whereby the assembly urges the golf club head to move away from the golf club shaft when the cylinder bore is pressurized pneumatically or hydraulically.

13. The cylinder and piston assembly of claim 12 wherein the first perimeter is approximately a first circle, the second perimeter is approximately a second circle approximately concentric with the first circle, and the bore cross section is therefore approximately an annulus.

14. The cylinder and piston assembly of claim 12 wherein the passage lies within the second perimeter of the bore cross section.

15. The cylinder and piston assembly, of claim 12 wherein the golf club shaft has an axis of symmetry, the bore cross section has a centroid, and the axis of the golf club shaft can pass through the centroid of the bore cross section.

16. A cylinder and piston assembly used to push a golf club head away from a golf club shaft, the assembly comprising: a piston means; a cylinder body having a passage through which the golf club shaft can pass and a cylinder bore means in which the piston means moves, the cylinder bore means having an intersection with a plane perpendicular to the direction of movement of the piston means which defines a bore cross section which has a centroid, and the centroid of the bore cross section can lie within the golf club shaft when the golf club shaft lies within the passage; and a sealing means which provides a pressure seal between the piston means and the cylinder bore means wherein the assembly is placed on the golf club shaft by passing the golf club shaft through the passage and the golf club shaft is clamped so that movement of the piston means can move the golf club head away from the golf club shaft; whereby pneumatic or hydraulic pressurization of the cylinder bore means urges the golf club head to move away from the golf club shaft.

17. The cylinder and piston assembly of claim 16 wherein the golf club shaft has an axis of symmetry and this axis can pass through the centroid of the bore cross section.

18. The cylinder and piston assembly of claim 17 wherein pressurization of the cylinder bore means results in a force on the piston means which is approximately symmetrical with the axis of the golf club shaft.

* * * * *